United States Patent [19]

Georgi

[11] 3,912,127
[45] Oct. 14, 1975

[54] PRECISION METERING SYSTEM
[75] Inventor: Donald K. Georgi, Minneapolis, Minn.
[73] Assignee: Graco Inc., Minneapolis, Minn.
[22] Filed: Oct. 29, 1974
[21] Appl. No.: 518,260

[52] U.S. Cl. .............................. 222/309; 222/309
[51] Int. Cl.² ....................................... G01F 11/06
[58] Field of Search ............ 222/309, 23, 76, 1, 14; 128/218 A

[56] References Cited
UNITED STATES PATENTS
3,252,619  5/1966  Miller ............................ 222/309 X
3,756,456  9/1973  Georgi ................................ 222/1
3,812,843  5/1974  Wootten et al. ................. 128/218 A
3,858,581  1/1975  Kamen ............................ 128/218 A Primary Examiner—Stanley H. Tollberg
Attorney, Agent, or Firm—Paul L. Sjoquist

[57] ABSTRACT

Apparatus is disclosed for metering pumped fluids and for providing a precision measurement of the fluid quantity delivered, said measurement apparatus including digital logic circuits for providing compensation for dispensing valve delays, pump stroke nonlinearity, and pump piston displacement leakage.

20 Claims, 10 Drawing Figures

PRECISION METERING SYSTEM

BACKGROUND OF THE INVENTION

This invention relates to a fluid pumping system having an electronic control apparatus associated therewith, for providing electronic compensation for fluid transfer discontinuities and non-linearities which occur during the pumping cycle. These non-linearities and discontinuities are present in any reciprocating pumping device, such as a piston pump operated by an air or hydraulic motor. During a pump piston stroke the transfer of fluid is substantially continuous, but in the region near either end of the pumping stroke the fluid transfer rate varies, depending upon a number of parameters relating to the pumping system. The present invention utilizes experimentally derived physical data relating to the behavior of the pump and pumping system, both during the pumping stroke and in the regions at either end of the stroke, and provides and electronic circuit apparatus for metering the pumped fluid and compensating for the inherent pumping system inaccuracies.

To a first approximation, the quantity of pumping fluid metered over a pump stroke is determined merely by taking the product of the piston area and the length of the pumping stroke. This provides a crude calculation of the fluid volume delivered, but ignores the leakage and discontinuities associated with the pump cycle, and which the present invention provides electronic compensation therefor.

My prior invention, described in U.S. Pat. No. 3,756,456, dated Sept. 4, 1973, describes a fluid metering system that employs a high resolution position sensor and associated electronics to very accurately control the amount of fluid dispensed, by measuring the linear displacement of the pump piston. The present invention is an improvement thereon, enabling the further precision metering of fluid over the entire pumping cycle, including the region at either end of the pumping stroke wherein the aforementioned non-linearities and discontinuities occur. The present invention also compensates for inherent fluid leakage which occurs around the pumping piston. The present invention, when used in conjunction with my previously patented invention, enables precision metering of fluids over all and any portion of the pumping cycle, and thereby provides an extremely accurate system for dispensing predetermined amounts of fluid.

SUMMARY OF THE INVENTION

The fluid metering system of this invention utilizes a positive displacement pump, together with a pump stroke displacement transducer of the type described in my prior patent, and electronic control circuitry for providing electronic compensation for leakages and discontinuities present in the physical pumping system. The electronic circuitry provides compensation for losses in the amount of fluid pumped during the top change-over portion of the pump's stroke, as a function of linear piston position, when the pump piston reverses its direction of travel in its cylinder. Electronic compensation is also provided for bottom change-over, when the pump piston reverses its direction of travel in the region near the opposite end of the pumping cylinder. Electronic circuitry is also provided to compensate for regions of pump stroke displacement which have been experimentally shown to result in a reduction of fluid output per unit increment of piston movement. Finally, compensation is also provided for errors in the quantity of fluid dispensed, due to valving delays in the system.

In the preferred embodiment, the pumping system consists of a hydraulically reciprocating motor which drives a double-acting reciprocating pump. The system is sequenced and controlled by an electric control device. Additional sequencing control is accomplished with external hydraulic valving which controls the flow of hydraulic fluid into the motor. In operation, at the time the motor piston is moving in its upstroke, an inlet valve is opened, allowing fluid to enter the lower chamber of the motor. At the time of a top changeover, a hydraulic spooling valve mechanism activates a hydraulic cylinder which in turn closes a valve and thereafter generates a pressure on the top of the motor piston to cause it to change direction. During down-stroke, the inlet valve is closed. When the motor reaches the bottom of its travel, the hydraulic spooling valve is again triggered to cause the external hydraulic cylinder to open the inlet valve. This causes the pressure to be removed from the top of the motor piston and allows the motor to drive in the up direction. Since the pump piston shaft is mechanically connected to the reciprocating motor piston, the pump piston follows the motor motion to pump fluid.

A rotary shaft encoder is connected to the pump piston shaft to measure discrete increments of pump piston motion. The shaft encoder generates quadrature pulses which can be interpreted to show not only movement, but also pumping stroke direction. The change in pump stroke direction, with the corresponding change in encoder quadrature phases, provides an indication to the electronic circuits associated therewith that a changeover is occurring. At the time of this changeover electronic compensators are activated to account for material pumping inaccuracies.

In normal operation, an electronic command representing the desired quantity of fluid to be delivered is transmitted to an input of an electronic multiplier. This command represents either the volume or the weight of the fluid to be delivered, and is electronically multiplied by a scaling factor which has been determined experimentally and takes into account the effective piston area relative to the desired fluid amount to be dispensed, together with constant leakage which occurs around the piston. The product of the command and the scaling factor is sent to a counter-comparator circuit as a parallel electronic binary-coded-decimal (BCD) representation.

A sequence function circuit is activated by a start pulse to cause the pumping system to deliver fluid and correspondingly move the shaft encoder to generate displacement-representative pulses. These pulses are counted, and the system is operated until the counted pulses are equal to the command quantity as modified by the scaling factor. During operation the electronic circuitry also activates the fluid dispensing valve to cause the fluid to flow.

The shaft encoder quadrature pulses are fed into a directional counter which determines the direction of pump stroke as well as the stroke displacement. When the pump piston reaches its changeover region, the directional counter activates a circuit which provides an electronic compensation for the amount of fluid metered during the changeover. This compensation operates by removing certain displacment pulses from the shaft encoder to accurately reflect actual fluid losses.

An area compensator circuit also operates to remove encoder pulses during that portion of the piston stroke wherein a smaller fluid output per unit increment of piston displacement has been experimentally shown to exist. This area compensator is pre-programmed and calibrated for any given pumping system, and provides it compensation thereafter for that system.

The shaft encoder pulses, with the appropriate compensations described above, are converted in a counter into a parallel BCD electrical representation and transmitted to a comparator unit. This unit compares the compensated encoder pulses with the command pulses and generates a signal whenever the two quantities become equal. This signal activates an electronic circuit to turn off the fluid dispensing valve. The turn off delay time of the dispensing valve is compensated for by electronically biasing one of the parallel binary representations which are matched in the comparator.

The present pumping and metering system operates effectively during all portions of the pumping cycle, thereby allowing either the metering of small fluid quantities which are only a fraction of a single stroke, or large fluid quantities which require many pumping cycles to deliver.

The primary object of this invention is to provide a highly precise fluid metering system which enables the dispensing of fluid quantities by a positive displacement pump.

An additional object of this invention is to provide the capability of precision metering of fluid during any portion of a pump stroke.

Another object of this invention is to provide the accurate metering of fluid in either large or small quantities, independently of a pumping system piston position.

Still another object of this invention is to provide electronic circuit compensation for pump displacement discontinuities and non-linearities during the piston changeover.

Yet another object of this invention is to provide electronic compensation for differences in quantities of fluid dispensed during portions of the pump piston stroke.

Another object of this invention is to provide electronic compensation for inaccuracies in fluid dispensing due to delays in valving actuation.

These and other objects will become apparent from the following specification and claims, and with reference to the attached drawings, in which:

DETAILED DESCRIPTION OF THE INVENTION

Figure 1:
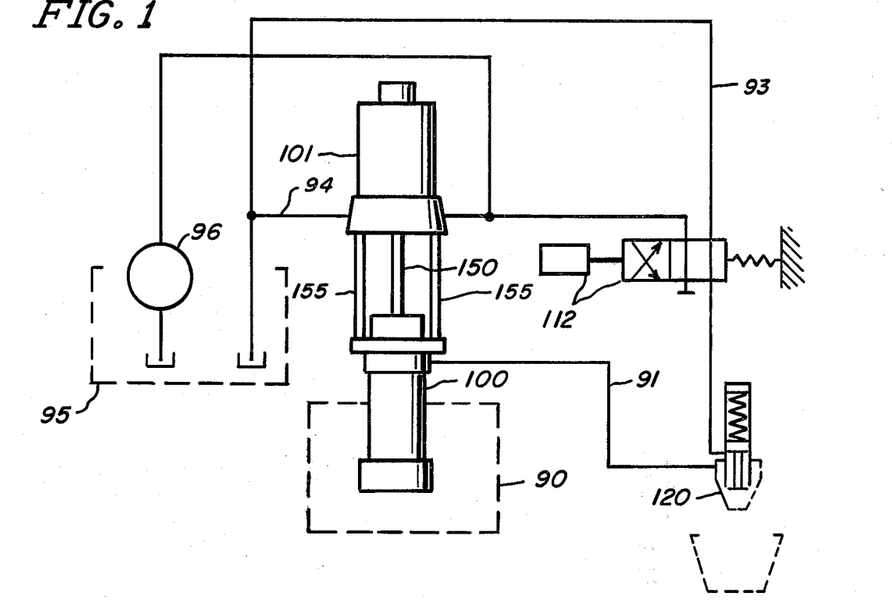
FIG. 1 shows a pictorial system diagram.

FIG. 1 is a pictorial representation of the system of this invention. A pump 100 is driven by a hydraulically reciprocating motor 101 via pump connecting rod 150. Pumping fluid is thereby withdrawn from material supply tank 90 and pumped over delivery line 91 to dispenser valve 120. Dispenser valve 120 is a hydraulically actuated valve which is opened by solenoid valve 112 upon electrical command from the circuitry to be described hereafter.

The hydraulic motor 101 and dispenser valve 120 receive their respective hydraulic fluid requirements from hydraulic reservoir 95, which supplies hydraulic fluid via a variable volume pump 96, according to well known operating principles. The hydraulic fluid is delivered to the motor 101 and valve 120 through suitable pressurized delivery lines, and return lines 93 and 94 are provided for returning hydraulic fluid to reservoir 95.

Figure 2:
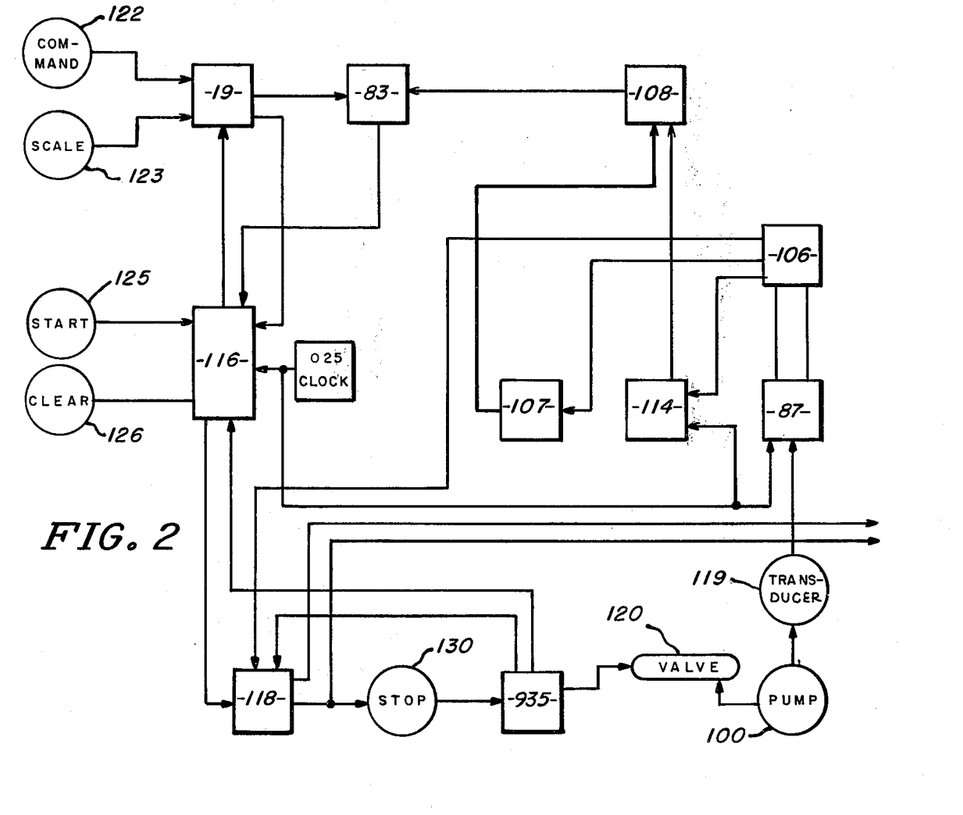
FIG. 2 shows a block diagram of the preferred embodiment of my invention.

FIG. 2 shows, in block diagram format, the interrelationship of the major system components. The positive displacement pump 100, of the type which utilizes a reciprocating piston within a cylinder, provides the fluid dispensing force. Pump 100 is typically driven by a hydraulic reciprocating motor. Typical motor and pump combinations which are usable with the present invention are the Graco Inc. model "Viscount" hydraulic motor, connected to a Graco Inc. model "Bulldog" reciprocating pump, both manufactured by Graco Inc., Minneapolis, Minn. A shaft encoder 119 is rotationally engaged against the pump piston rod to provide an electronic signal representation of the piston rod displacement. A typical encoder usable in the present invention is model DRC-77, manufactured by Dynamics Research Corp., Stoneham, Mass. This encoder transforms very small linear incremental movements of the piston rod into serial electrical pulses. The resolution of the encoder enables it to sense piston movements as small as 0.00001 inch, and to generate an electrical signal for this incremental unit of travel of the piston rod.

The serial output pulses of encoder 119 are coupled to a directional counter 87. Counter 87 accumulates the serial pulses in the form of a sequential electrical count, and is able to determine from the signal of encoder 119 whether the accumulated count is an upward downward piston rod direction. As the pump piston nears its maximum upward or downward displacement, counter 87 accumulates a relatively large magnitude count. When the pump piston changes its displacement direction a bounce eliminator circuit 106 senses the direction change and causes a respective top changeover compensator 114 or bottom changeover compensator 107 to become activated. Either of these compensators generates a corrective digital count for adjusting the value stored in counter 87, to effectively compensate for the change in fluid dispensing characteristics which occur during changeover. Compensator 107 and 114 are connected to area compensator 108, which also generates an electrical compensation count to compensate for variations in the effective piston dispensing area between for pump upstroke and downstroke. All of these compensations are applied to the measured displacement count of counter 87, and the count as modified by the compensating values is coupled into comparator 83. Comparator 83 also has an input from multiplier 19, and comparator 83 monitors each of these two inputs until it senses an equality between them. When an equality is detected, comparator 83 generates a signal for stopping the pump 100 from further dispensing. This signal is connected into sequencer 116. Sequencer 116 has, in addition to a comparator 83 input, manual "start" and "clear" input lines form an operator's panel start switch 125 and clear switch 126. The operator controls these switches and can initiate or stop the metering system upon activation of respective switches. Sequencer 116 functions to regulate the interaction of the various components of the system. For example, it controls the starting and stopping of the pump, and also controls the manual entry of command and scaling factors into multiplier 19. Pump control is achieved through a signal from a sequencer 116 to a value extender circuit 118, which is in turn coupled to interface driver circuit 111. Interface driver circuit 111 generates the appropriate electrical signal to cause an electro-mechanical dispenser valve 120 to open or close and thereby regulate fluid transfer.

Several manual operator controls are available to control the operation of the system. A start switch 125 and a clear switch 126, described hereinbefore, are respectively used to start the system, and to stop the system by clearing data stored in system storage registers. A stop switch 130 can be activated to disable interface driver circuit 111 and thereby shut off dispenser valve 120. A command switch 122 is adjustable to the desired quantity of materials to be pumped, in units of weight or volume as may be convenient for any typical operation. Scaling factor switch 123 is used to modify the number set into command switch 122 to a number properly scaled for use within the system for accurate metering. Scaling factor switch 123 is normally reset only when different desired units of measure are set into command switch 122.

Each of the major components illustrated in FIG. 2 will be described in its detailed operation hereafter. These major system components comprise the broad teaching of the present invention, illustrating an embodiment which has all of the preferred compensation features therein. Without departing from the spirit of the invention, and in cases where lesser compensation is required, various compensation features can be deleted from the broad apparatus illustrated in FIG. 2.

DISPLACEMENT TRANSDUCER

Figure 3:
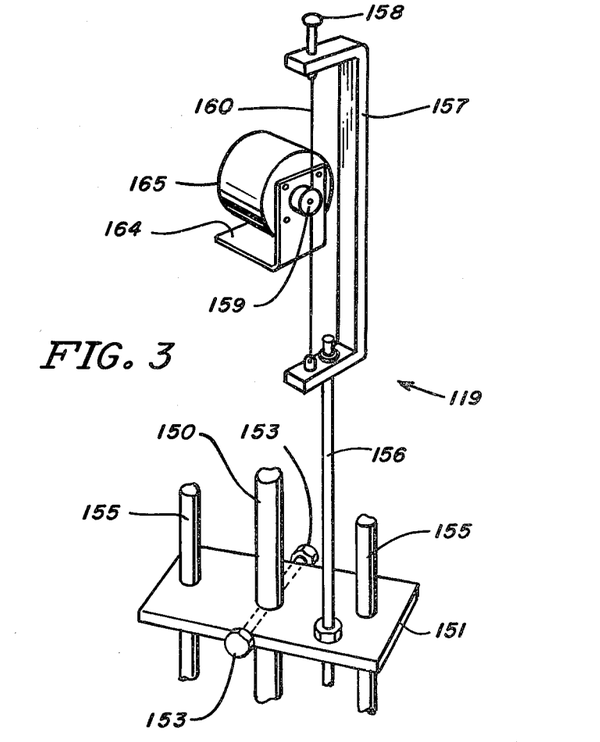
FIG. 3 illustrates the displacement transducer connection.

FIG. 3 illustrates the displacement transducer 119, and its connection to the hydraulic motor and pump assembly. The reciprocable hydraulic motor and pump are not shown in this figure, but the interconnection assembly and the displacement transducer mechanical connections thereto are illustrated. A pump connecting rod 150 connects the reciprocating hydraulic motor to the pump piston. Rod 150 is rigidly connected to plate 151 by means of clamping bolt 153. The upward and downward travel of plate 151 is guided by pump support tubes 155 which space and securely fasten the motor and pump assembly together. These tubes also prevent plate 151 from rotating, by restraining its freedom of motion to an upward and downward direction.

A transducer connecting rod 156 is bolted to plate 151. A U-bracket 157 is securely attached to the upper end of transducer connecting rod 156. U-bracket 157 has interior securing means for holding a wire 160. Wire 160 extends between the ends of U-bracket 157, and is looped around pulley 159. The looped wire is held under tension by means of tension adjusting screw 158. Pully 159 is attached to the rotatable shaft of encoder 165. Therefore, reciprocal motion of the pump is followed by means of the displacement transducer assembly, causing pully 159 to rotate as wire 160 and bracket 157 are reciprocated. The rotation of pully 159 is converted to an electrical output pulse representation by means of the internal circuitry of encoder 165. Encoder 165 is rigidly secured (not shown) to the hydraulic motor assembly by means of mounting bracket 164.

Encoder 165 has two signal wires over which output signal pulses are generated whenever the encoder pully 159 is rotated. These signal wires will be referred to as the A signal and B signal for convenience of description herein. The signals A and B are output in alternating fashion as a signal pair. If pully 159 rotates in one direction, the time sequence of the pulse pair is A–B and if the pully rotates in the opposite direction, the time sequence of the pulse pair is B–A. The rate of occurrence of respective pulse pairs depends upon the speed of rotation of pully 159. Therefore, both the direction of rotation and the angular displacement of pully 159 can be determined by monitoring the pulse pair sequence and counting the number of pulse pairs which are generated. For purposes of explanation herein, we shall denote a pulse sequence A–B as representing downward piston travel, and a pulse sequence B–A shall denote upward piston travel.

DIRECTIONAL COUNTER

Figure 4:
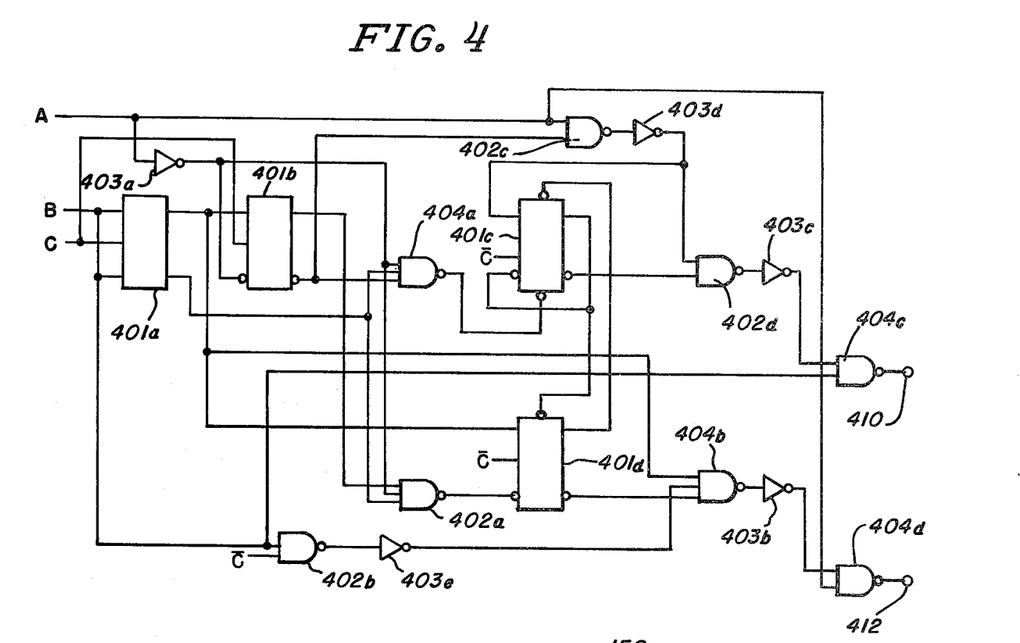
FIG. 4 is a circuit logic diagram of the directional counter.

FIG. 4 illustrates the logic diagram for directional counter 87 of FIG. 1. The output of encoder 165 is the electrical pulse pair just described, and shown as inputs A and B in FIG. 4. Input C is a clock signal from an oscillator to be hereinafter described. If encoder 165 is tracking the pump piston downward, the pulse pair occurs in the order A–B, with the A pulse arriving first, followed shortly thereafter by the B pulse. If encoder 165 is following the pump piston upward, the pulse pair arrives B–A, with the B pulse arriving first, followed shortly thereafter by the A pulse. Thus, the function of the logic circuit of FIG. 4 is to determine the ordered pulse pair arrangement, and to generate an appropriate output signal on either the up count line or the down count line. The logic circuit of FIG. 4 is activated by the respective A and B pulses, together with the clock pulse to be described hereinafter. For present purposes it is sufficient to understand that the clock pulse is a periodically reoccurring single phase signal which is used to control the respective internal electrical operations according to an orderly timing sequence and which operates at about four times the maximum rate of A and B pulses. The clock signal may itself provide a timing control, or the signal may be inverted such that its inverted value may be used to control timing of internal electrical events.

In FIG. 4 and elsewhere in this specification, standard logic symbols are used to illustrate the signal interaction. These symbols may be understood from a reading of any of a number of well known technical books and articles, and will not be explained in detail herein. The circuits used to construct the logic of FIG. 4 are commercially available semiconductor circuits, typical examples of which are listed below:

| Designation | Manufacturer | Mfr's Type | Logic name |
| --- | --- | --- | --- |
| 401 | Fairchild Semiconductor | 9024 | Flip-flop |
| 402 | Fairchild Semiconductor | 7400 | Nand (AND) |
| 403 | Fairchild Semiconductor | 7404 | Inverter |
| 404 | Fairchild Semiconductor | 7401 | Nand (AND) |

The logic diagram of FIG. 4 will be understood by those skilled in this art, and therefore a detailed explanation of its operation is unnecessary to the understanding of the invention. It is sufficient to understand that, with the A and B pulse pair sequences as hereinbefore described, the logic generates an "up" signal at terminal 410 or a "down" signal at terminal 412. The number of up or down signals generated is representative of the linear displacement of pump piston rod 150, and therefore of the pump piston.

PUMP CHANGEOVER COMPENSATION

The pulses representative of up and down displacement of the pump piston rod provide a representation of the amount of pumped fluid metered by the apparatus for so long as the piston travels smoothly in either direction. When the piston enters the region at and following the bottom or top of its stroke, special compensation circuits are used to compensate for the metering and measuring irregularities which occur. The metering irregularities are caused by changes in piston displacement efficiency which occur at the end of the piston stroke, and by the pump internal valving which also becomes activated at the end of the piston stroke. Measurement irregularities are also sensed by the encoder 165, which tends to generate erratic "bounce" pulses at or near the transition point of a piston displacement change. These "bounce" pulses are due to hydraulic and mechanical oscillations, and appear as an erratic sequence of up and down pulses around the piston transition point.

Figure 5:
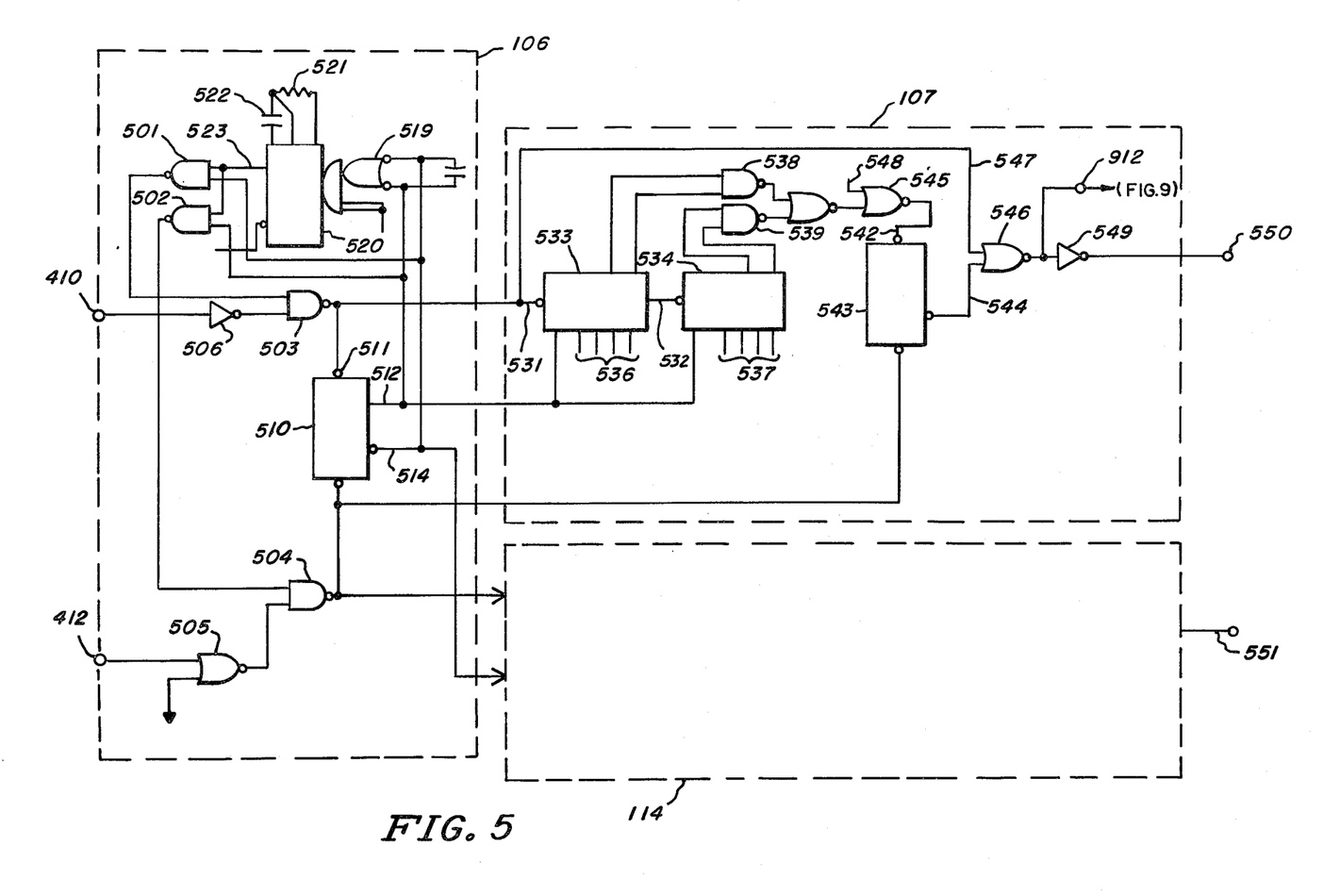
FIG. 5 is a circuit logic diagram of the changeover compensators and bounce eliminator.

The foregoing irregularities are compensated for in the circuits illustrated in FIG. 5, which shows the bounce eliminator circuit 106, the top changeover compensator 114 and bottom changeover compensator 107. Since top changeover compensator 114 is identical to the circuits of bottom changeover compensator 107, only the detailed circuits of bottom changeover compensator 107 are shown in FIG. 5.

The up pulses from terminal 410 (FIG. 4) and the down pulses from terminal 412 (FIG. 4) are received by the circuits of bounce eliminator 106, which functions to eliminate erratic and spurious signals that occur during changeover. For example, as the piston approaches its upper displacement limit directional counter 87 continues to generate up pulses. When the piston reaches its upper limit and begins its first incremental downward motion, directional counter 87 generates a first down pulse. Thereafter, and for a short displacement interval, several additional up pulses may erroneously occur. Bounce eliminator 106 functions to sense the first down pulse and to thereafter eliminate spurious and erroneous up pulses which might thereafter occur.

Bounce eliminator 106 includes a flip-flop 510, which can be triggered into one of two electrical states, each of which signifies an up displacement or down displacement of the pump piston. For purposes of example, we shall assume that the pump piston is travelling upward, and reaches its upper limit of displacement and begins its downward travel. During the upward travel pulses are received at terminal 410, transmitted through AND gate 503 to the "set" input 511 of flip-flop 510. Set output 512 thereby has a logical signal present, which signal is coupled to input circuitry 519 of one-shot flip-flop 520. Flip-flop 520 differs from flip-flop 510 in that 520 generates, upon receiving a signal via its input circuit 519, a single pulse of limited and fixed time duration. The time of this pulse is determined by selecting appropriate values for resistor 521 and capacitor 522. In the preferred inventive embodiment, resistor 521 is chosen to be 3900 ohms and capacitor 522 is chosen at 5 microfarads, giving an output pulse from one-shot flip-flop 520 of 40 milliseconds. This pulse is generated over output line 523, and it feeds into AND gates 501 and 502. The second input into AND gate 502 is from set output 512 of flip-flop 510. Therefore, during the time interval while flip-flop 510 is set and one-shot flip-flop 520 has an output signal, AND gate 502 is enabled and a logical signal is developed at its output. This logic signal is inverted and fed to AND gate 504 to disable the AND gate and prevent further signals received at terminal 512 from being sensed by the subsequent circuits. Similarly, when flip-flop 510 is "reset," reset output line 514 generates an enabling signal to condition AND gate 501 so that an output on line 523 from one-shot flip-flop 520 is ANDed and inverted by gate 501 to disable AND gate 503 and prevent subsequent pulses arriving via terminal 410 from being transmitted into the subsequent circuits.

During the up displacement of the pump piston flip-flop 510 is set by signals entering terminal 410; during the down displacement of the piston flip-flop 510 is reset by signals entering via terminal 412. At a transition point in piston displacement, flip-flop 510 is triggered into its opposite state by the first subsequent differing pulse received on terminals 410 and 412 respectively. For a brief period of time during this transition interval both the set line 512 and the reset line 514 are logically equivalent. It is only during this brief time interval that the input circuit 519 of one-shot flip-flop 520 becomes active. This circuits senses that lines 512 and 514 are equivalent and generates a signal into one-shot flip-flop 520 to cause the output signal as hereinbefore described. The output signal from flip-flop 520 serves to create a "bounce" window of predetermined time to prevent flip-flop 510 from erratically changing state as the up and down signals may appear at terminal 410 and 412 respectively. Therefore, if we assume flip-flop 510 has been set because of an upward pump piston displacement, the first down pulse received on terminal 412 will cause flip-flop 510 to reset. For a brief time interval as hereinbefore described, lines 512 and 514 are equivalent and input circuit 519 generates a signal into one-shot flip-flop 520. After this brief time period, flip-flop 510 is in the reset state and line 514 enables AND gate 501. The one-shot output signal on line 523, together with the signal on line 514, enables AND gate 501 which causes a disabling signal to be sent to AND gate 503 and to thereby disconnect the input circuit from receiving subsequent up pulses via terminal 410. The down pulses are transmitted a top changeover compensator 114 for compensating the measurement circuits as will be hereinafter described. Similarly, as the pump piston displacement transitions at its downward limit, one-shot flip-flop 520 generates a bounce window which disables AND gate 504 and enables AND gate 503 so that subsequent up pulses received via terminal 410 may be transmitted into bottom changeover compensator 107.

It is to be emphasized that bottom changeover compensator 107 and top changeover compensator 114 are activated only during the transition interval while the pump piston is changing its displacement direction. For purposes of explanation we will describe the operation of bottom changeover compensator 107, it being understood that top changeover compensator 114 operates identically in its region of piston displacement. Bounce eliminator 106 has hereinbefore been described, so that it is understood that during bottom changeover the up pulses received via terminal 410 are fed into bottom changeover compensator 107 for a predetermined time, regulated by one-shot flip-flop 520. Bottom changeover compensator 107 functions to count these pulses and to eliminate a predetermined number of them in order to compensate for the metering irregularities which occur at changeover. In order to accomplish this function, the changeover logic includes a two stage counter 533 and 534. Counter stage 533 receives up signals at input 531 and electronically counts said signals. When counter stage 533 reaches its maximum count, it generates a signal on stage connection line 532 and resets to begin its count anew. The signals received via stage connection line 532 are counted by counter stage 534 in a manner similar to the operation of counter stage 533. Therefore, if counter stages 533 and 534 are selected from those known in the art which count decimal digits, counter stage 533 will count nine pulses received at input 531 and will subsequently generate a signal on line 532 to counter stage 534. In this manner stage 533 represents the 1's decimal digit and stage 534 represents the 10's digit in a counter having a total count capacity of 99 decimal counts. Using this example, both counter stages are together able to count a total of 99 input up signals received on terminal 410 and transmitted to input 531.

Counter stages 533 and 534 are each capable of receiving preset inputs over line groups 536 and 537 respectively. These preset signals are transmitted from circuits which will be hereinafter described. The count magnitudes held within stages 533 and 534 at any given instant may be monitored by logic circuits such as gates 538 and 539. These gates are designed to generate an output signal whenever the count in stages 533 and 534 reaches a predetermined value, chosen in the preferred embodiment to be the value "99." When this value is reached, gates 538 and 539 cause a signal to be generated to set flip-flop 543 via set input 542. When flip-flop 543 becomes set it generates a signal over its output line 544 to gate 546. This causes gate 546 to become responsive to subsequent up pulses received via terminal 410 and line 547. Thereafter, subsequent up pulses are transmitted through compensator 107 to area compensator 108 via terminal 550. A similar terminal (551) exists for compensator 114 for similar purposes.

In operation, counter stages 533 and 534 serve to eliminate a predetermined number of pulses which are received at terminal 410, and to prevent these pulses from being transmitted out via terminal 550. The number of pulses which are eliminated are equal to the difference between the count detected by gates 538 and 539 and the reset count entered via line groups 536 and 537. Therefore, if a decimal count of 19 were entered into counter stages 533 and 534 via line groups 536 and 537, and gates 538 and 539 were wired to sense a count of 99, the difference between these two numbers (99 minus 19) would be the number of up pulses eliminated from reception by terminal 550. The preferred value of the difference number to be utilized in the compensator circuit is determined empirically by actually measuring the irregularities in metering pumped fluid during changeover. Although changeover circuit 114 operates identically to changeover circuit 107, the preset and monitored counts may be adjusted differently if tests indicate that different compensation is required during the respective changeover cycles.

It is apparent from the foregoing description that flip-flop 543, being in the set state, enables the count pulses to be transmitted through the changeover compensator to terminal 550. During the initial starting time it therefore becomes necessary to generate a signal to set flip-flop 543. The signal is generated via line 548 into gate 545. It causes gate 545 to become activated and to set flip-flop 543 via input 542. Therefore, upon initially starting the apparatus, the displacement pulses via terminal 410 are coupled directly to output terminal 550. A similar starting arrangement is included in compensator 114, so that the apparatus may be started in either an upward or a downward piston displacement mode.

The circuits used to construct the logic of FIG. 5 are commercially available semiconductor circuits, typical examples of which are listed below:

| Designation | Manufacturer | Mfr's Type | Logic Name |
|---|---|---|---|
| 501–504 | Fairchild Semiconductor | 8560 | Nand (AND) |
| 505 | Fairchild Semiconductor | 7402 | Nor (OR) |
| 506,549 | Fairchild Semiconductor | 7404 | Inverter |
| 510,543 | Fairchild Semiconductor | 9024 | Flip-flop |
| 519,520 | Fairchild Semiconductor | 9601 | One-shot |
| 533,534 | Fairchild Semiconductor | 9310 | Counter |
| 538,539 | Fairchild Semiconductor | 8560 | Nand (AND) |
| 545,546 | Fairchild Semiconductor | 7402 | Nor (OR) |

AREA COMPENSATOR

Figure 6:
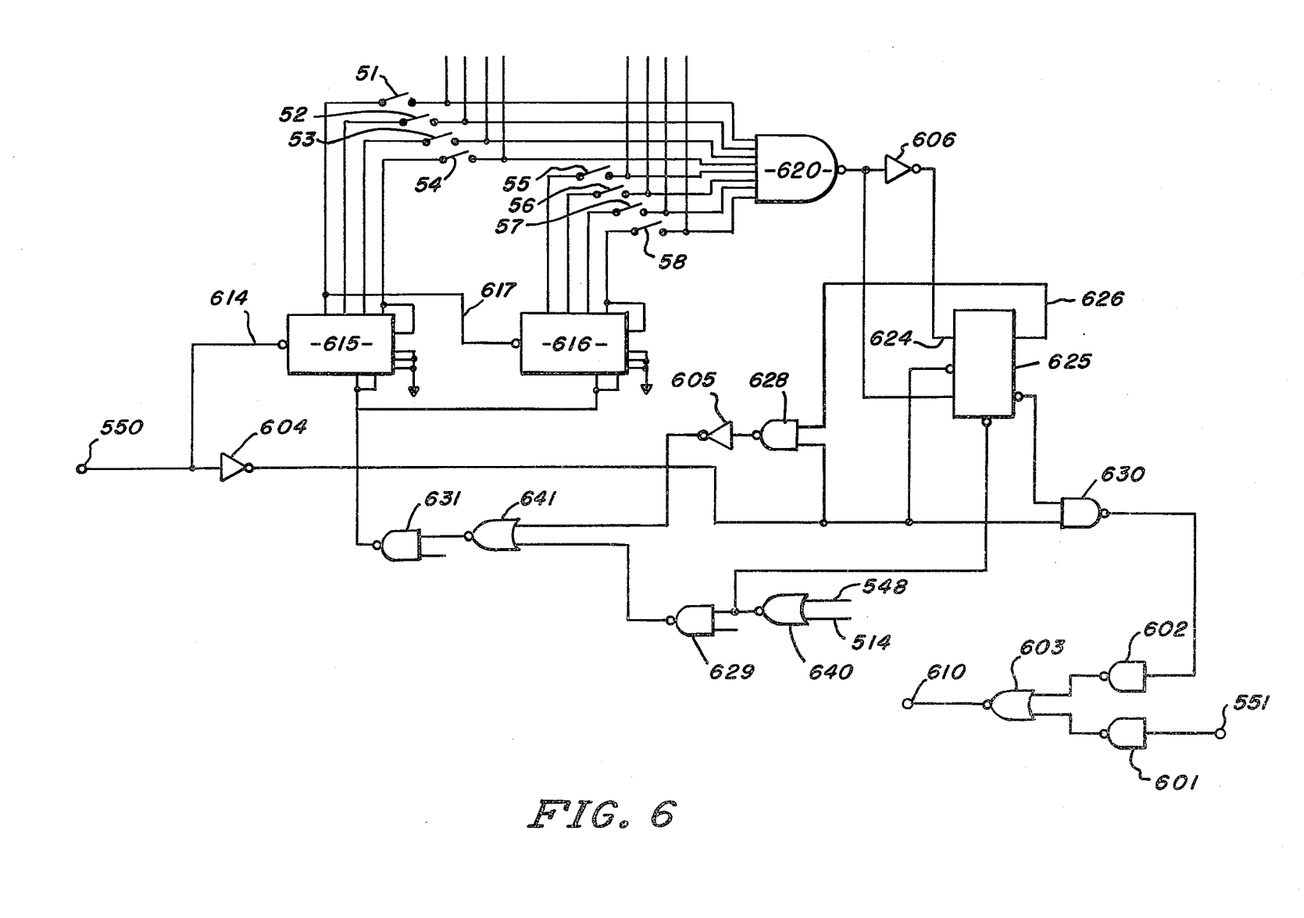
FIG. 6 is a logic circuit diagram of the area compensator.

The area compensator 108 is used to balance the metering of material pumped during the upstroke vs. the downstroke of the pump. This compensation is necessary because the effective cross-sectional area of the pump piston is different for the respective pumping strokes. This effective difference in cross-sectional area is a phenomena well known in the art of pumping and will not be further explained herein. FIG. 6 illustrates the logic circuits used in the preferred inventive embodiment to perform the necessary area compensation. The circuits operate to remove counted pulses periodically from the stream of displacement pulses received over either, but not both, terminal 550 or 551 (FIG. 5) so as to adjust the electronic count of displacement to more accurately represent the respective amount of fluid actually delivered. For purposes of explanation herein we shall assume that the pump delivers more material during its downstroke than it does during its upstroke, thereby making it necessary to remove periodically an up displacement pulse. Since it is the area difference for which compensation is needed, there is no need to compensate both the upstroke and the downstroke, but only the stroke for which the pump fluid is relatively less than the count pulses would indicate.

FIG. 6 illustrates area compensator 108, wired to remove periodic pulses from the upstroke count. Downstroke pulses from terminal 551 (FIG. 5) are gated directly through area compensator 108 via gates 601 and 603 to output terminal 610. Upstroke pulses are also gated out of area compensator 108 via gate 603 and output terminal 610, but only after being modified by the area compensator logic as is hereafter described.

Each upstroke pulse arriving via terminal 550 is gated into counter stages 615 and 616. These counter stages operate in a manner similar to that already described relative to counter stages 533 and 534. When an up pulse is received at input 614, counter stage 615 increases its count by 1, and when it reaches a maximum count, determined by the connection of stage connector line 617, it generates a count signal to the input of counter stage 616. If we assume that counter states 615 and 616 are decimal counters arranged count in BCD format, each will have four binary output signal lines. The four binary output signal lines for counter stage 615 pass through four switches, 51–54, to AND gate 620. Likewise, the four binary output signal lines from counter stage 616 pass through four switches 55–58 to AND gate 620. Each of these switches 51–58 may be selectively opened or closed to cause AND gate 620 to become sensitive to the binary count represented by the respective line. In this manner, switches 51–58 may be selectively activated to cause an output signal from AND gate 620 in response to any desired count in counter stages 615 and 616. For example, if it is desired to sense a count of 99, switches 51, 54, 55 and 58 would be closed to make the inputs to AND gate 620 responsive to logical signals on the four respective lines represented by these switches. AND gate 620 would therefore generate an output signal whenever the four connected lines have signals, representative of the number 99.

The output signal from AND gate 620 is connected to flip-flop 625 at set input 624. The signal causes flip-flop 625 to become set, which generates a signal at gate 630 to disable the next subsequent up count pulse received at terminal 550 from reaching output terminal 610. The set output signal from flip-flop 625 is transmitted via line 626 to gate 628. This signal, in combination with the next subsequent up count pulse at terminal 550, causes counter stages 615 and 616 to reset and thereby causes the count to begin anew.

Area compensator 108 is initially placed in the proper operating state by signals on lines 548 and 514, acting through gate 640. The signal on line 514 is representative of an up displacement direction, and the signal on line 548 appears when the apparatus is started by the operator. Therefore, when the apparatus is started in the up direction the signals on lines 548 and 514 cause gate 640 to generate a signal which resets flip-flop 625 and clears counter stages 615 and 616 to their initial zero count states.

The circuits used to construct the logic of FIG. 6 are also commercially available circuits, typical types being illustrated below:

| Designation | Manufacturer | Mfr's. Type | Logic Name |
|---|---|---|---|
| 601,602 | National Semiconductor | 8560 | Nand (AND) |
| 603 | Fairchild Semiconductor | 7402 | Nor (OR) |
| 604–606 | Fairchild Semiconductor | 7404 | Inverter |
| 615,616 | Fairchild Semiconductor | 9310 | Counter |
| 620 | Fairchild Semiconductor | 9007 | Nand (AND) |
| 625 | Fairchild Semiconductor | 9024 | Flip-flop |
| 628–631 | Fairchild Semiconductor | 8560 | Nand (AND) |
| 640,641 | Fairchild Semiconductor | 7402 | Nor (OR) |

COUNTER-COMPARATOR

Figure 7:
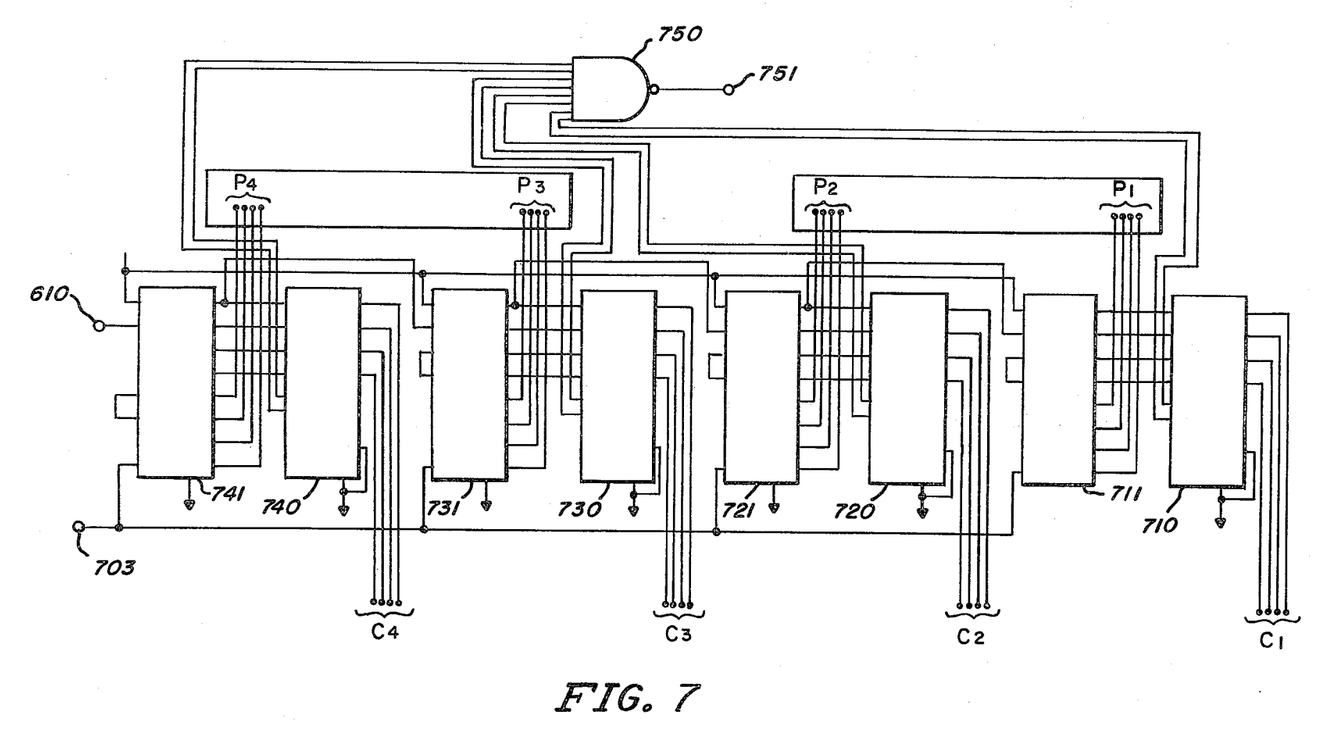
FIG. 7 is a logic circuit diagram of the counter-comparator.

FIG. 7 illustrates the counter-comparator 83. Counter-comparator 83 receives an input signal at terminal 610 (see FIG. 6) and a plurality of binary BCD signals over line groups C1, C2, C3, and C4, from multiplier 19. Each of the binary input BCD signals are stored in register circuits 710, 720, 730, and 740 respectively. Register circuits 710–740 also contain comparator logic which provides a comparison of the respective four input signal lines (i.e., C1, etc.) with the four lines connecting the respective circuits with circuits 711, 721, 731, and 741. These last named circuits are BCD decade counter circuits which are serially connected to count pulses received at input terminal 610. When the total count of such input pulses equals the respective preset counts in register circuits 710, 720, 730, and 740, all of the input lines to AND Gate 750 are enabled and an output signal is generated at output terminal 751. This output signal is representative of an equality between the preset input quantity (C1–C4) and the measured and compensated pump displacement quantity.

Counter-comparator 83 also has built into its circuits a provision for presetting a number of counts into each of the respective decade counter stages 711, 721, 731 and 741 to compensate for the time delays in operating valve mechanisms. These presetting inputs are illustrated on FIG. 7 as line groups P1, P2, P3, and P4. Line groups P1–P4 are arranged in BCD format, and any one of the lines within the respective line groups may be connected through suitable switches (not shown) to a voltage source to preset the count in the respective stages. The lines so activated are energized by a signal at input terminal 703, which terminal is activated prior to the start of any counting operation. The net effect of presetting the count in counters 711, 721, 731, and 741 is to cause these counter stages to begin counting from a non-zero starting point, and thereby to cause them to reach the end point (when AND gate 750 generates a signal at terminal 751) sooner than would otherwise be the case. This premature generation of a stop signal at terminal 751 compensates for the additional time required by the valving mechanisms associated with dispensing valve 120 to complete the metering shut off.

Figure 8:
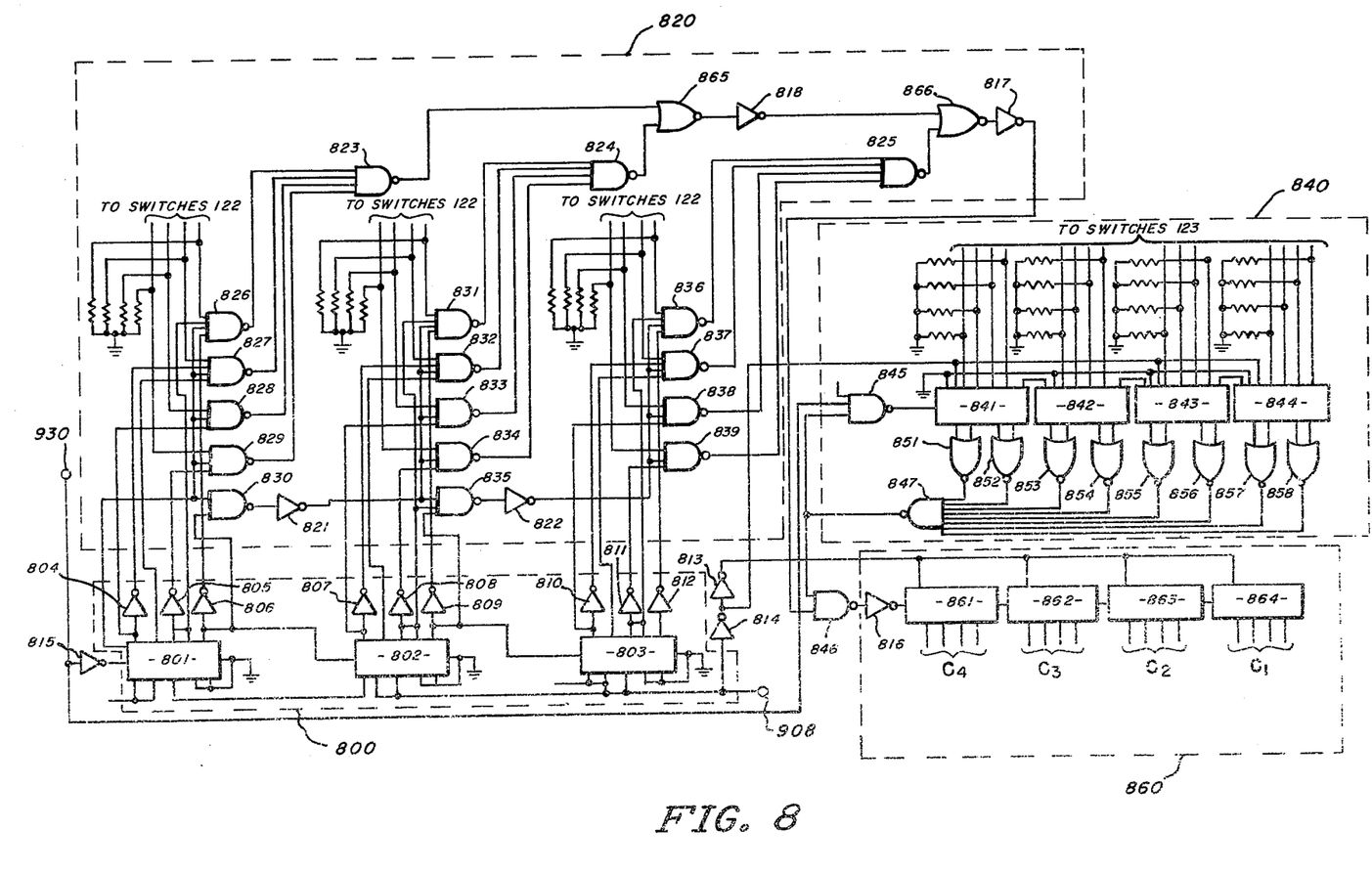
FIG. 8 is a logic circuit diagram of the programmer-multiplier.

The commercially-available circuits used to construct the logic of FIG. 7 are listed below:

| Designation | Manufacturer | Mfr's Type | Logic Name |
| --- | --- | --- | --- |
| 710,720, 730,740 | Fairchild Semiconductor | 9324 | Comparator/ Register |
| 711,721, 731,741 | Fairchild Semiconductor | 9310 | Decade Counter |
| 750 | Fairchild Semiconductor | 9007 | Nand (AND) | an operator's panel for selection and adjustment by the operator.

The semiconductor circuits needed to construct the logic illustrated in FIG. 8 are commercially available. Examples of typical circuits satisfactory for this purpose are given below:

| Designation | Manufacturer | Mfr's. Type | Logic Name |
| --- | --- | --- | --- |
| 801–803 | Fairchild Semiconductor | 9310 | Counter |
| 804–818 | Fairchild Semiconductor | 7404 | Inverter |
| 821–822 | Fairchild Semiconductor | 7404 | Inverter |
| 823–839 | Fairchild Semiconductor | 8560 | Nand (AND) Comparator/ |
| 841–844 | Fairchild Semiconductor | 9324 | Register |
| 845–847 | Fairchild Semiconductor | 8560 | Nand (AND) |
| 851–858 | Fairchild Semiconductor | 7402 | Nor (OR) |
| 861–864 | Fairchild Semiconductor | 9310 | Counter |
| 865,866 | Fairchild Semiconductor | 7402 | Nor (OR) |

MULTIPLIER

The preset BCD signal line input groups C1, C2, and C3, and C4 (FIG. 7) are generated in the multiplier 19, illustrated in FIG. 8. A detailed description and disclosure of an electronic multiplier which functions as a sort of multiplier 19 is given in the July, 1968, edition of the magazine, "The Electronic Engineer" and will not be replaced herein. The description herein deals primarily with those adaptations and additions to the prior art multiplier which are necessary for operation of the present inventive apparatus.

Multiplier 19 consists essentially of four interrelated and interacting sections. A master counter 800 feeds a digital rate multiplier 820; the output of digital rate multiplier 820 is combined with the outputs from countdown section 840 into totalizer 860. The outputs from totalizer 860 form the presetting input BCD groupings C1, C2, C3, and C4 which are fed into counter comparator 83 (FIG. 7). These output BCD groupings represent the product of the binary BCD number manually input into digital rate multiplier 820 by means of command switches 122 (not shown) and the binary BCD number set in scaling factor switches 123 (not shown). Each of these manually inputed quantities are set in by means of their respective switches, and they represent the desired meter setting for the total amount of pumped fluid to be delivered according to some delivery scale, i.e., gallons, quarts, liters, etc., and a scaling factor which, when multiplied by the desired metering quantity, forms a BCD number grouping for commanding the apparatus to meter the desired quantities. The scaling factor quantity need be set into its switches 123 only once, and the apparatus will thereafter meter according to that scaling factor. The desired metered quantity is set into switches 122 each time a different quantity of pumped fluid is desired to be delivered. All the manual switches associated with multiplier 19 may be conveniently located on

SEQUENCE FUNCTIONS

Figure 9:
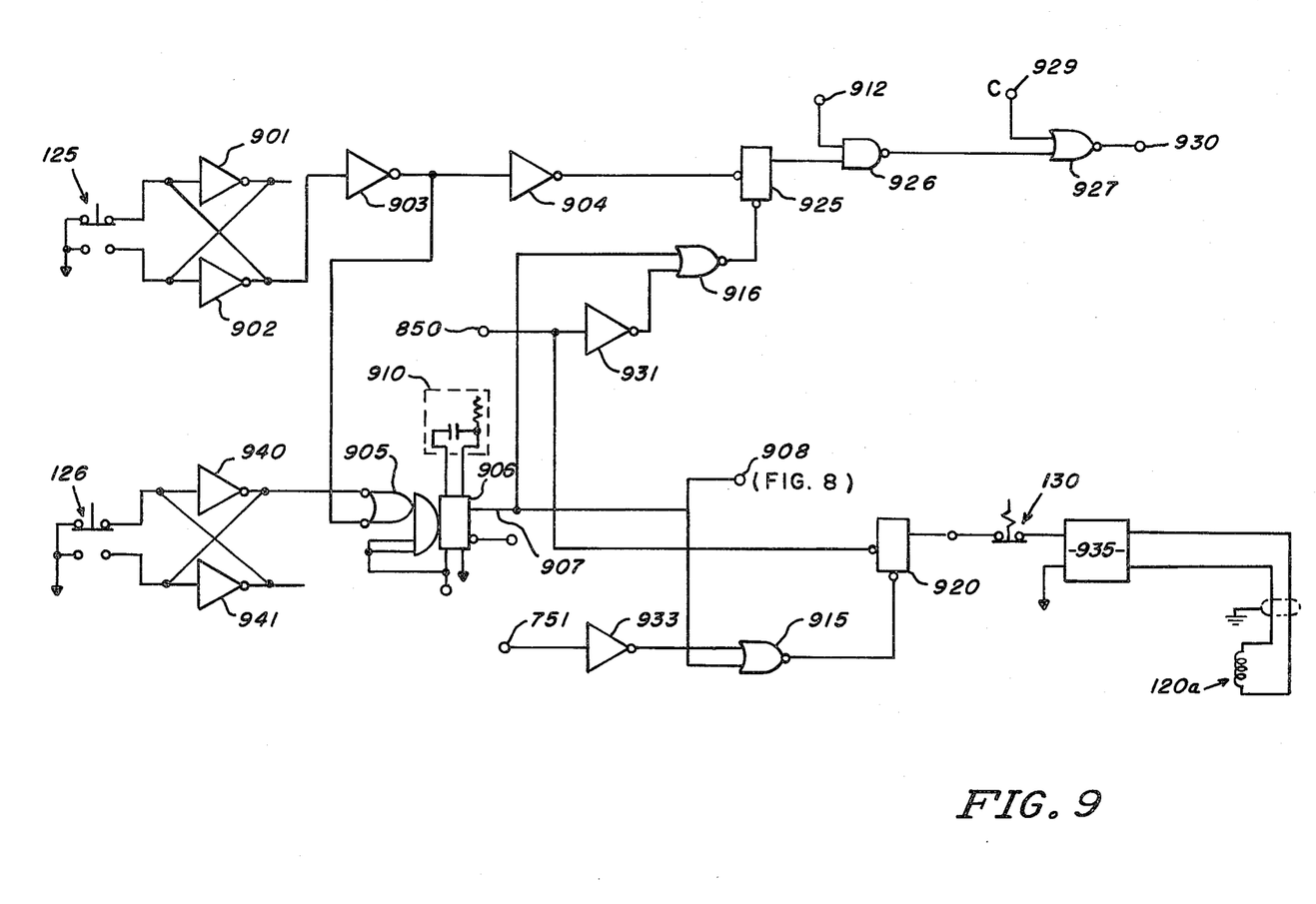
FIG. 9 is a logic circuit diagram of the sequence functions.

FIG. 9 illustrates the circuits and logic for initiating and stopping the apparatus sequences. The switches shown in FIG. 9 are preferably located on an operating panel within convenient access to the operator of the apparatus. A start switch 125 operates in conjunction with inverters 901 and 902 to provide a single start pulse. When start switch 125 is depressed, a signal is generated by inverter 902 to inverter 904 and input circuitry 905 to one-shot flip-flop 906. Flip-flop 906 generates a pulse of predetermined time duration, as determined by RC circuit 910, to reset all flip-flops and registers in the apparatus; the signal is transmitted via line 907 to gates 915 and 916, and the preferred time duration for the signal on line 907 is 90 microseconds, which has been found suitable for the intended purposes. Gate 915 resets flip-flop 920 and gate 916 resets flip-flop 925. When start switch 125 is returned to its initial position, inverter 904 generates an input to "toggle" flip-flop 925 and thereby set flip-flop 925.

This causes gate 926 to generate a signal into gate 927 (assuming the bounce eliminator circuit of FIG. 5 is not active and the proper signal is therefore present on terminal 912), which enables gate 927 to thereafter generate clock pulses at terminal 930 in response to clock signals received at input terminal 929. The clock signals at terminal 930 are connected via suitable lines to multiplier 19 (FIG. 8) to control the multiplier sequence. At the time the multiplier sequence has been completed a signal is returned from multiplier 19 output terminal 850. The signal from terminal 850 is connected into inverter 931 and gate 916 to reset flip-flop 925 and thereby stop further clock pulses from being transmitted to multiplier 19 via terminal 930. The signal from terminal 850 is also transmitted to toggle flip-flop 920, thereby causing flip-flop 920 to become set, and activating circuits to be hereinafter described for energizing dispenser valve 120.

At the time when the metering of the desired amount of pumped fluid has been completed and the counter comparator 83 reaches an equivalence, a signal is generated by counter comparator 83 and received on terminal 751. This signal is inverted by inverter 933 and fed into gate 915 which in turn resets flip-flop 920. Resetting flip-flop 920 causes the generation of a stop signal to the dispensing valve solenoid 120a. Alternatively, the metering of fluid through dispensing valve 120 may be stopped at any time manually by depressing stop switch 130.

The apparatus may also be stopped from further metering at any time by depressing clear switch 126. This switch is connected to inverter 940 and 941 in a manner similar to that described for start switch 125, to generate a single pulse into input circuit 905. As hereinbefore explained, input circuit 905 causes one-shot flip-flop 906 to generate a single, time limited, pulse to clear the apparatus registers and flip-flops.

The circuits used constructing the logic illustrated in FIG. 9 are commercially available semi-conductors, typical examples of which are listed below:

| Designation | Manufacturer | Mfg's Type | Logic Name |
|---|---|---|---|
| 901 | Fairchild Semi-conductor | 7404 | Inverter |
| 902 | Fairchild Semi-conductor | 7404 | Inverter |
| 903 | Fairchild Semi-conductor | 7402 | Nor(OR) |
| 904 | Fairchild Semi-conductor | 7404 | Inverter |
| 905, 906 | Fairchild Semi-conductor | 8601 | One-shot flip-flop |
| 915 | Fairchild Semi-conductor | 7402 | Nor (OR) |
| 916 | Fairchild Semi-conductor | 7402 | Nor(OR) |
| 920 | Fairchild Semi-conductor | 74107 | Flip-flop |
| 925 | Fairchild Semiconductor | 74107 | Flip-flop |
| 926 | Fairchild Semiconductor | 7400 | Nand (AND) |
| 927 | Fairchild Semiconductor | 7402 | Nor (OR) |
| 931 | Fairchild Semiconductor | 7404 | Inverter |
| 933 | Fairchild Semiconductor | 7404 | Inverter |
| 940 | Fairchild Semiconductor | 7404 | Inverter |
| 941 | Fairchild Semiconductor | 7404 | Inverter |

Signals for activating and deactivating solenoid coil 120a are converted from logic-level voltages to power-level voltages and currents in interface network 935. Network 935 may be a commercially-available package, such as Type MSR-100 manufactured by Monsanto Corp.

Figure 10:
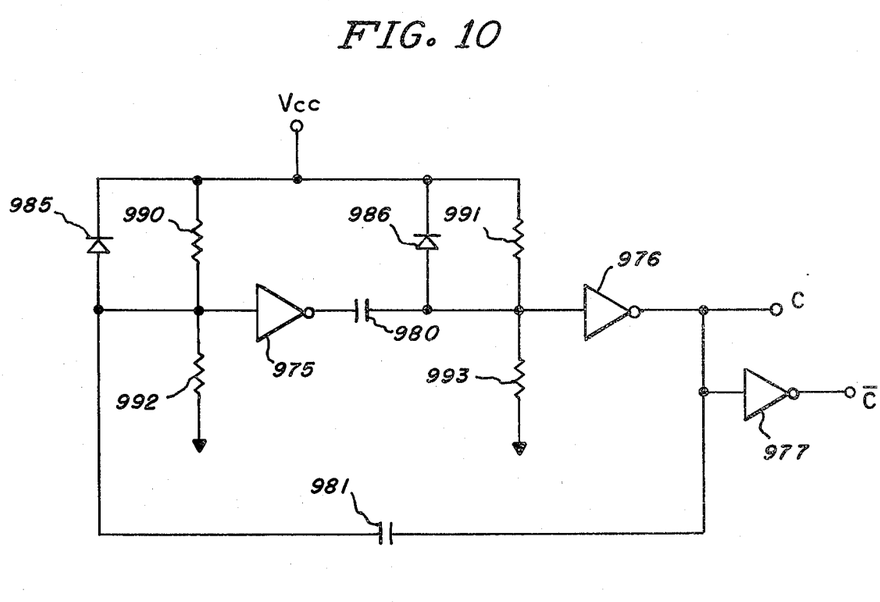
FIG. 10 is a logic circuit diagram of the clock circuit.

The clock circuit of this invention is shown in FIG. 10. The circuit is a free-running oscillator formed by connecting inverters 975 and 976 in a series path, separated by capacitors 980 and 981 as shown. Resistors 990–993 and diodes 985 and 986 complete the circuit design, to form a square-wave oscillator which operates at a frequency determined essentially by the values of the capacitors 980 and 981. With the components and values shown below the oscillator operates at a frequency of approximately 100 kiloHertz (kHz). The clock signal output C may be inverted through inverter 977 to create a signal $\bar{c}$, which allows both clock phases to be used as gating signals in the invention.

| Designation | Type | Value |
|---|---|---|
| 975–977 | Inverter | 7404 |
| 980,981 | capacitor | .005 microfarad |
| 985,986 | diode | 1N914 |
| 990,991 | resistor | 5,100 ohms |
| 992,993 | resistor | 1,000 ohms |
| Vcc | D.C. voltage | 5 volts |

What is claimed is:

1. Apparatus for selecting and metering the quantity of material pumped from a reciprocating-piston pump, comprising:

a. piston displacement-tracking means for generating electrical signals responsive to piston displacement changes;

b. selection and conversion means for manually selecting a desired pumped quantity and converting said manually selected quantity into electrical signals representative of said quantity;

c. a first register connected to said piston displacement-tracking means, for accumulating and storing said displacement electrical signals;

d. a second register connected to said selection and conversion means, for storing said quantity-representative electrical signals;

e. a comparison circuit connected to said first and second registers, for generating a stop signal when said respective register signals are equal;

f. first means for electrically biasing said first register signals, connected to said piston displacement-tracking means and to said first register, for compensating for metering inaccuracies in the regions of piston displacement direction change; and g. second means for electrically biasing said first register signals, connected to said piston displacement-tracking means and to said first register, for compensating for metering inequality in respective different piston displacement directions.

2. The apparatus of claim 1, further comprising and electrically-operated metering valve connected to said pump and said comparison circuit, and activated by said comparison circuit stop signal.

3. The apparatus of claim 2, further comprising means for electrically biasing said second register signals, connected to said second register and to said comparison circuit, for compensating for said metering valve shutoff time delay.

4. The apparatus of claim 1 wherein said selection and conversion means further comprises a manually operable electrical switch, a manually presettable electrical register for storing electrical signals representative of a scaling factor, and an electrical multiplier circuit connected to said switch and said register for generating output signals representative of the product of said two inputs and representative of said desired pumped quantity.

5. The apparatus of claim 4 wherein said first register further comprises an electrical counter circuit.

6. The apparatus of claim 5, wherein said piston displacement-tracking means further comprises a first pulse generating means for generating signals representative and indicative of piston displacement in a first direction; and second pulse generating means for generating signals representative and indicative of piston displacement in a second direction.

7. The apparatus of claim 6, wherein said first means for biasing said first register signals further comprises first and second changeover circuits connected to said first and second pulse generating means for monitoring signals therefrom, and for detecting the first signal representing a changeover from one pulse generating means to the other, and for blocking subsequent signals from the previous pulse generating means for a predetermined time interval thereafter.

8. The apparatus of claim 7, wherein said first and second changeover circuits each further comprise a counter for counting signals from said pulse generating means; a presettable register for storing a predetermined signal count; and a blocking circuit connected to said counter and said presettable register for generating a blocking signal until an equality is detected in said counter and said register; and means for connecting said blocking signal to the input of said first register connected to said piston displacement-tracking means, for disabling said first register while said blocking signal is present.

9. The apparatus of claim 8 wherein said presettable register for said first changeover circuit stores a different count than said presettable register for said second changeover circuit.

10. The apparatus of claim 6 wherein said second means for electrically biasing said first register signals further comprises a monitoring circuit connected to said first pulse generating means, said monitoring circuit being capable of blocking periodically one of said signals representative and indicative of piston displacement in a first direction.

11. The apparatus of claim 10 wherein said monitor circuit further comprises a counter having at least $n$ count positions, and where the $n$th count is a blocking signal; means for preselecting the $n$th count position of said counter; and means for resetting said counter to a zero count after every $n$ counts.

12. A pumping and metering system for enabling the selection of a desired quantity of fluid material to be transferred from a material reservoir to a distribution point, for transferring said selected fluid quantity and for metering the transferred fluid quantity, comprising:
  a. a controllable reciprocating pump connected between said material reservoir and said distribution point;
  b. an electrically-actuable valve connected in said fluid-material transfer path;
  c. an electrical valve control circuit connected to said valve for actuating said valve in opening and closing positions;
  d. means for tracking the reciprocating displacement of said pump, connected to said pump, said means for tracking having electrical circuits for generating signals responsive to pump displacement and having circuits for compensating for displacement-responsive signals which do not accurately reflect fluid material quantities transferred because of pump changeover discontinuities and pump reciprocating-direction displacement differences; and
  e. manual fluid material selection means for providing signals representative of the desired quantity of fluid material to be transferred, connected to said means for tracking and to said valve control circuit, and having electrical circuits for comparing said signals representative of the selected fluid material quantity with said compensated signals responsive to pump displacement, and generating a valve actuating signal when said selected quantity signals are equal to said compensated displacement-responsive signals.

13. The apparatus of claim 12 wherein said compensating circuits associated with said means for tracking further comprise circuits for detecting pump displacement signals at displacement direction change points, and circuits for blocking a predetermined number of subsequent displacement signals.

14. The apparatus of claim 13 wherein said compensating circuits associated with said means for tracking further comprise circuits for detecting the direction of pump displacement, and circuits for periodically blocking displacement signals in predetermined quantities in a preselected displacement direction.

15. The apparatus of claim 14 wherein said means for tracking further comprises a shaft encoder mechanically coupled to said pump and capable of providing displacement signals indicative of displacement and displacement direction.

16. The apparatus of claim 15 further comprising a valve time delay compensating circuit connected to said circuits for comparing said signals representative of the selected fluid material quantity with said compensated displacement-responsive signals.

17. The apparatus of claim 14 wherein said manual fluid selection means further comprises means for selecting a desired quantity according to a first dimensional convention, and means for selecting a scaling factor, and a multiplier connected to both of said means, said multiplier forming the product of the scaling factor and the selected desired quantity.

18. The apparatus of claim 17, further comprising a register connected to said multiplier for storing the product.

19. The apparatus of claim 18, further comprising a register associated with the means for tracking, and connected to said circuits for compensating, said register functioning to store said compensated signals.

20. The apparatus of claim 19, wherein said manual fluid material selection means' electrical circuits for comparing is connected to said multiplier-connected register and said register connected to said circuits for compensating.

* * * * *